(12) United States Patent
McMahon et al.

(10) Patent No.: US 9,995,532 B2
(45) Date of Patent: Jun. 12, 2018

(54) SELF-CLEANING JET TUBE

(71) Applicant: USNR, LLC, Woodland, WA (US)

(72) Inventors: Irven J. McMahon, Painesville, OH (US); Clinton Spangler, Mentor, OH (US)

(73) Assignee: USNR, LLC, Woodland, WA (US)

( * ) Notice: Subject to any disclaimer, the term of this patent is extended or adjusted under 35 U.S.C. 154(b) by 0 days. days.

(21) Appl. No.: 15/348,801

(22) Filed: Nov. 10, 2016

(65) Prior Publication Data

US 2017/0059243 A1   Mar. 2, 2017

Related U.S. Application Data

(63) Continuation of application No. 14/875,551, filed on Oct. 5, 2015, now Pat. No. 9,494,365.

(60) Provisional application No. 62/062,037, filed on Oct. 9, 2014.

(51) Int. Cl.
| | |
|---|---|
| *F26B 13/00* | (2006.01) |
| *F26B 21/00* | (2006.01) |
| *B05B 1/20* | (2006.01) |
| *B23P 15/00* | (2006.01) |

(52) U.S. Cl.
CPC ............ *F26B 21/004* (2013.01); *B05B 1/205* (2013.01); *B05B 15/52* (2018.02); *B23P 15/00* (2013.01); *F26B 13/008* (2013.01); *F26B 2210/14* (2013.01)

(58) Field of Classification Search
CPC .... B05B 1/02; B05B 1/14; B05B 1/20; B05B 1/205; B05B 9/002; B05B 15/02; B05B 15/0208; B05B 17/0638; F26B 13/008; F26B 21/004; F26B 2210/14
See application file for complete search history.

(56) References Cited

U.S. PATENT DOCUMENTS

| | | | | |
|---|---|---|---|---|
| 4,132,363 A | * | 1/1979 | Kruger | B05B 1/044 239/455 |
| 4,155,178 A | * | 5/1979 | Weldon | F26B 13/10 239/557 |

(Continued)

OTHER PUBLICATIONS

New Zealand Patent Application No. 731042; Examination Report; dated Oct. 17, 2017.

(Continued)

*Primary Examiner* — Ryan A Reis
(74) *Attorney, Agent, or Firm* — Schwabe Williamson & Wyatt

(57) ABSTRACT

Embodiments of a self-cleaning jet tube may include an elongate hollow body that is generally rectangular in cross-section and tapered from an open first end to a second end generally opposite the first end. The elongate hollow body may have an upper wall, a lower wall, side walls, a plurality of apertures arranged along the upper wall, an end plate coupled with the walls at the second end, and at least one through-slot. A through-slot may be disposed through the end plate or a wall, between the end plate and a wall, or between two walls. The jet tube may be configured for use with the through-slot(s) open and unblocked, thereby allowing debris to be expelled from the jet tube during operation of the jet veneer dryer. Corresponding systems and method are also provided herein.

26 Claims, 9 Drawing Sheets

(56) References Cited

U.S. PATENT DOCUMENTS

| | | | | |
|---|---|---|---|---|
| 4,919,336 | A | * | 4/1990 | Hudon ...................... D21F 1/34 |
| | | | | 162/275 |
| 5,850,841 | A | * | 12/1998 | Han .................. H01L 21/67051 |
| | | | | 134/198 |
| 6,250,318 | B1 | * | 6/2001 | Kiat .......................... B05B 1/20 |
| | | | | 134/122 R |
| 7,650,897 | B2 | * | 1/2010 | Kopp ...................... B05B 1/205 |
| | | | | 134/198 |

OTHER PUBLICATIONS

Australian Patent Application No. 2015328397; Examination Report; dated Mar. 7, 2018.

* cited by examiner

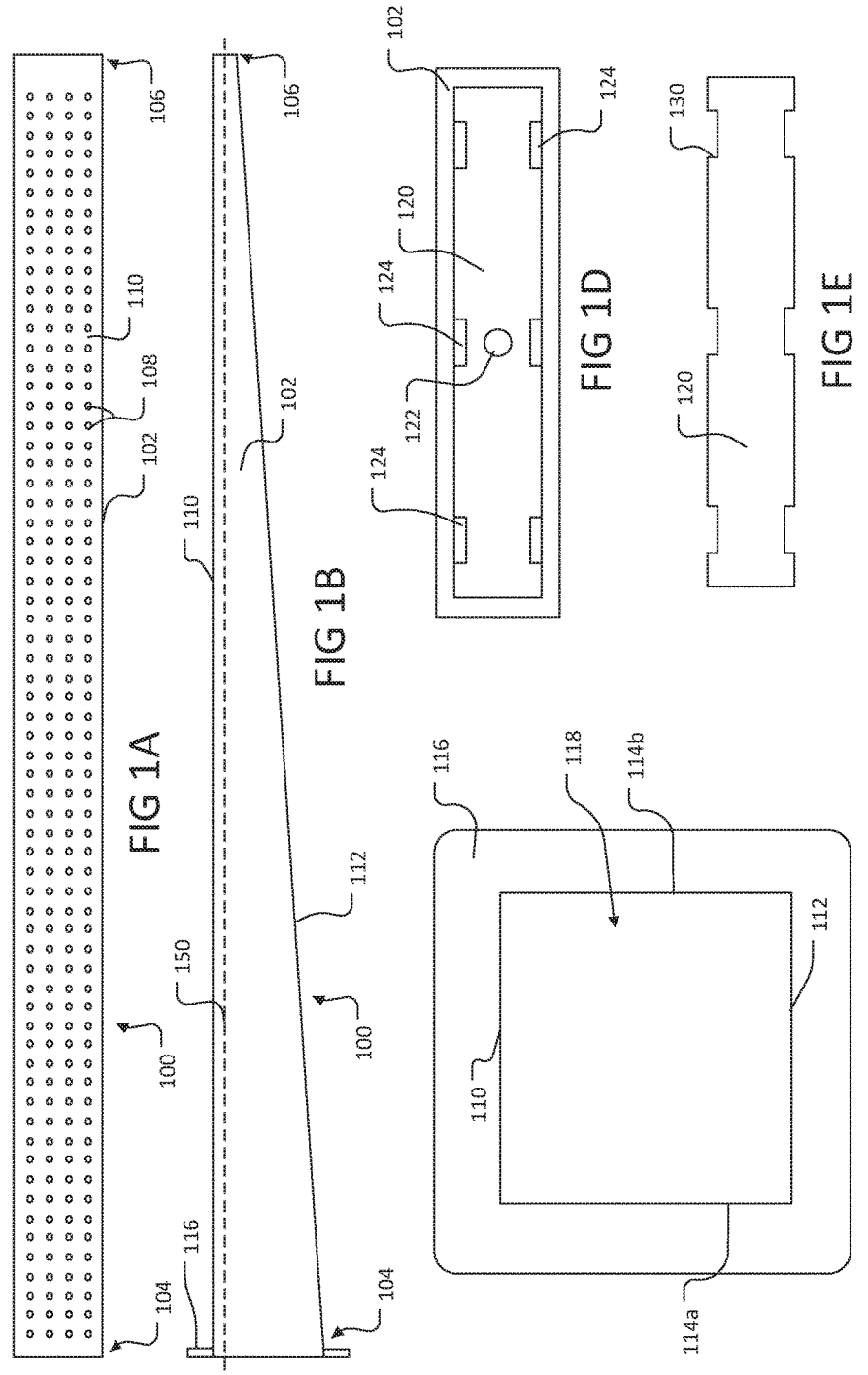

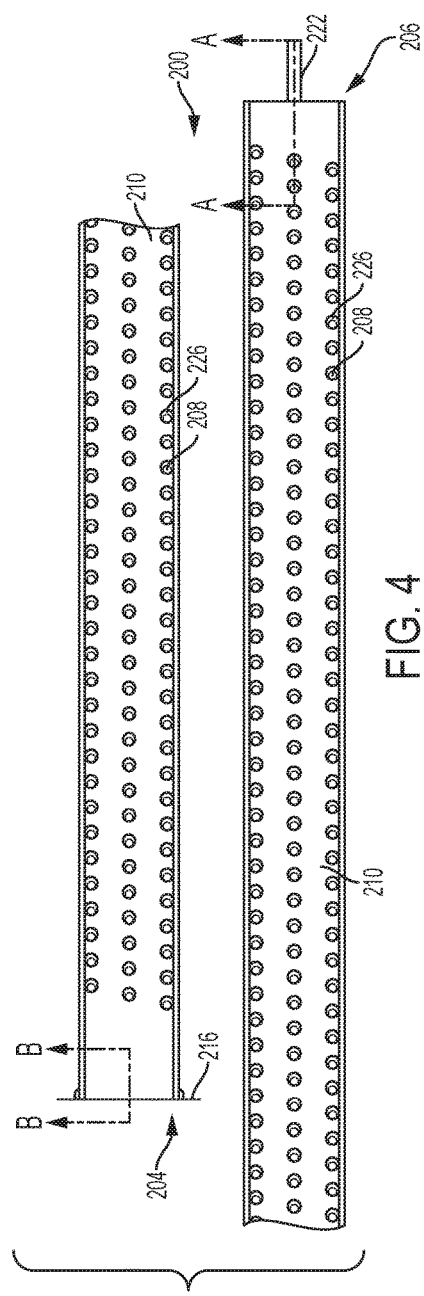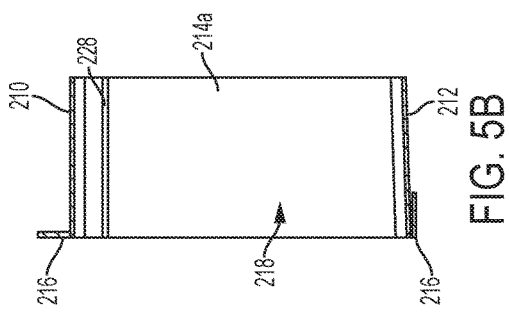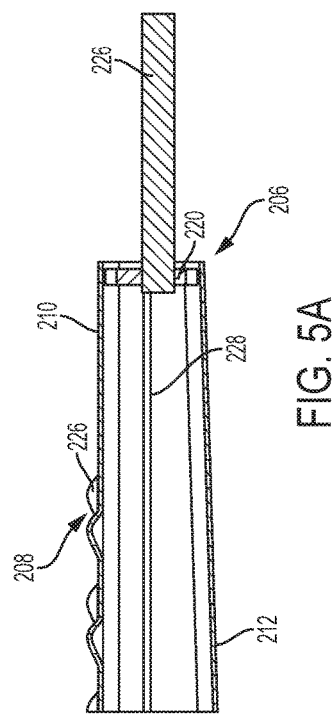

US 9,995,532 B2

SELF-CLEANING JET TUBE

CROSS REFERENCE TO RELATED APPLICATIONS

The present application is a continuation of U.S. patent application Ser. No. 14/875,551 filed Oct. 5, 2015, which claims priority to U.S. Patent Application No. 62/062,037 filed Oct. 9, 2014, both entitled "Self-Cleaning Jet Tube," the entire disclosures of which are hereby incorporated by reference.

BACKGROUND

Veneer dryers are commonly used in the wood products industry to lower the moisture content of veneer for plywood manufacturing and other applications. Logs are peeled or sliced to produce sheets of "wet" veneer, which is then loaded into a veneer dryer for drying. If the veneer is not dried to a particular moisture content, further processing stages may be adversely affected. For example, if the veneer will be glued to another layer of wood, too much residual moisture may prevent proper adhesion. Conversely, veneer that is too dry may absorb more glue, resulting in higher processing costs.

Jet veneer dryers have become increasingly popular. Jet veneer dryers are designed to dry veneer by directing air to impinge on the veneer surface at high velocities, commonly 2,000-10,000 feet per minute. Veneer jet dryers may be either direct-fired or indirect-heated. In direct-fired dryers, hot combustion gases from a direct fired air heater are blended with recirculated air from the dryer to reduce the combustion gas temperature. The blended gases are then circulated over the veneer. In contrast, indirect-heated veneer dryers use steam or circulated hot oil coils to heat the recirculated air before it passes over the veneer.

A typical jet veneer dryer is an elongate chamber with an upstream drying section, a downstream cooling section, and 1-6 vertically stacked "decks" extending from the input end of the drying section to the output end of the cooling section. Within the drying section, each deck has upper and lower driven rollers or belts for conveying the sheets of veneer along a corresponding flow path through the drying section. Between adjacent pairs of veneer rollers or belt supporting rollers are positioned pairs of elongated vertically-opposed jet tubes that extend horizontally across the deck from an air-delivery side to a generally opposite air return side. The drying section also includes an air circulation system with air-delivery side plenum, a return side plenum, heaters, and fans.

The jet tubes are generally rectangular in cross-section and tapered longitudinally from a large open end at the air-delivery side to a small closed end with a mounting bracket at the return side. The large open end is usually sealed against the framework of the drying section by a plate or other such feature. A plurality of apertures are provided along one surface of the jet tubes. Some of the jet tubes are mounted below the veneer flow path in an aperture-side-up orientation, and others are mounted above the veneer flow path in an aperture-side-down orientation. Heated air moves under pressure from the air-delivery side plenum into the open end of the jet tubes, flowing through the holes in the veneer-facing surfaces of the jet tubes and against the veneer moving along the flow path.

Jet dryers have some disadvantages. One drawback is that the narrow ends of the jet tubes tend to become plugged with accumulated debris. The accumulated debris reduces the flow of heated air at the return side of the decks, and can also cause a fire within the drying section. Conventional jet dryers must be cleaned typically at three week intervals to remove condensed volatile organic compounds (VOC's) and wood debris. A common method of removing debris from jet tubes involve using a flood of water that back washes and floats the debris from the tube as it drains. Another method uses a water or air lance which is activated after the lance is inserted from the large end of the tube to the small end and then is slowly backed out removing the debris as the lance is removed. Some jet tubes have a small aperture at the narrow end and a movable or removable cap or plug fitted over the opening to allow air or water to be introduced through the opening in the narrow end. A fourth method is to remove each jet tube from the dryer, position the jet tube vertically with the tapered end up, and pound the open end of the jet tube against the floor to dislodge debris. These cleaning methods are time-consuming, labor-intensive, and costly, and can present a risk to personnel.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 1A-E illustrate schematic views of an embodiment of a self-cleaning jet tube;

FIG. 4 illustrates a plan view of an embodiment of a self-cleaning jet tube;

FIGS. 5A-B illustrate sectional views taken along lines A-A and B-B, respectively, of FIG. 4;

DETAILED DESCRIPTION OF DISCLOSED EMBODIMENTS

Figure 2A:
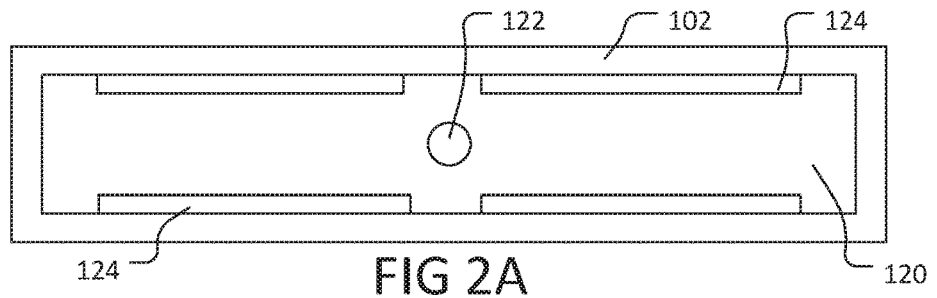
FIGS. 2A-2E illustrate block diagrams of embodiments of a self-cleaning jet tube.
Figure 2B:
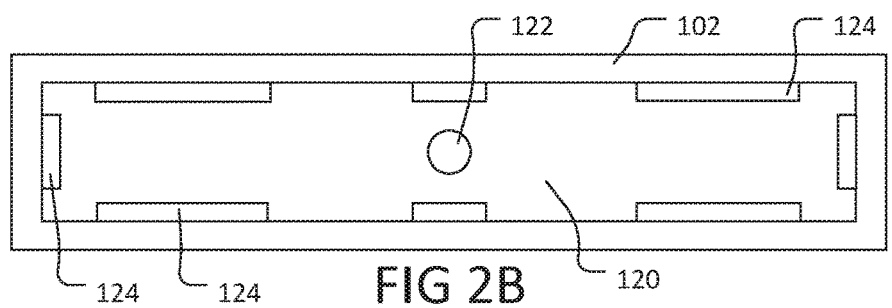
Figure 2C:
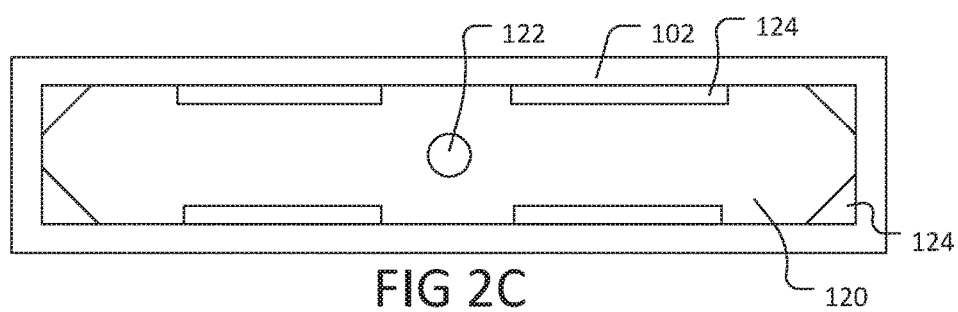
Figure 2D:
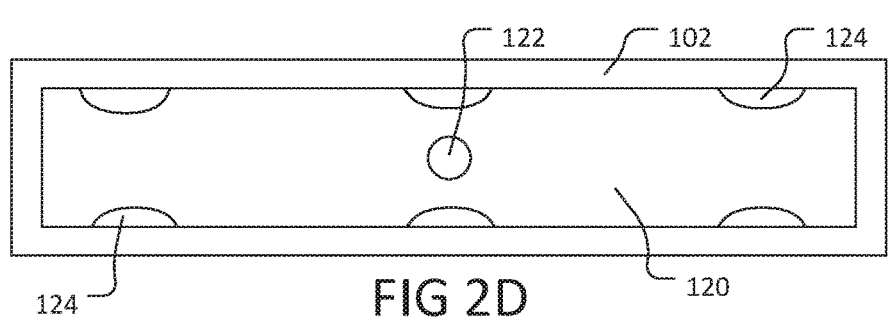
Figure 2E:
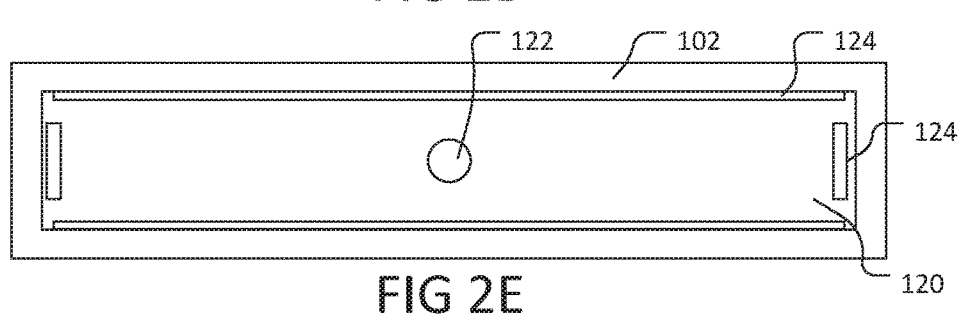

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

As used herein, the term "through-slot" means a passage through a generally solid structure, such as a plate or a wall of a hollow body, or a passage between two such structures. Unless otherwise indicated, a given through-slot can have any shape (e.g., square, rectangular, triangular, circular, semicircular, ovoid, trapezoidal) or size. A through-slot may be formed by removing material from a solid structure or a component thereof (e.g., by cutting), by forming the solid structure and the through-slot simultaneously (e.g., by molding), by coupling the solid structure to another structure in a manner that leaves a gap between the structures that serves as a through-slot, by coupling the solid structure to another structure and moving (e.g., bending) a portion of the solid structure away from the other structure to create a gap that serves as a through-slot, and/or by any other suitable method.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computing device may be endowed with one or more components of the disclosed apparatuses and/or systems and may be employed to perform one or more methods as disclosed herein.

Embodiments described provide self-cleaning jet tubes suitable for use in both direct-fired and indirect-heated jet veneer dryers. In direct-fired dryers, hot combustion gases from direct fired air heaters are blended with recirculated air from the dryer to reduce the combustion gas temperature. The blended gases are then circulated over the veneer. In contrast, indirect-heated veneer dryers use steam or circulated hot oil coils to heat air before circulating the heated air over the veneer. In these dryers, debris must pass through the heating coils to get into the jet tubes. Due in part to factors such as fin spacing and veneer thickness, most of the pieces of debris that collect in the jet tubes of indirect-heated veneer dryers are less than ½"×½"×⅙." Moreover, they tend to collect primarily on the bottom of the jet tube toward the narrow end where the conveying velocity approaches zero. While it is theoretically possible for larger debris to enter the jet tubes in a direct-fired veneer dryer, a substantial percentage of the pieces of debris are likely to be smaller, as in indirect-heated veneer dryers.

In various embodiments, a self-cleaning jet tube may be provided with one or more through-slots configured to provide a passage through which debris can be blown from the interior of the jet tube during normal drying operations of the jet veneer dryer. A self-cleaning jet tube may be configured to be used with the through-slot(s) open and unblocked while in use. Thus, a self-cleaning jet tube may lack plugs or caps configured to block air loss through the through-slots. The dimensions, placement, and/or number of through-slots may vary among embodiments. However, in some embodiments a through-slot may be configured to provide continuous evacuation of debris from the jet tube without substantially reducing the air pressure at the apertures.

In various embodiments, a self-cleaning jet tube may include an elongate hollow body with a generally open first end, a generally closed second end, and one or more through-slots. The elongate hollow body may be generally rectangular in cross-section, with four sides and a plurality of apertures arranged along one of the sides. For ease of reference, the description below refers to the side with the apertures as the "top" or "upper" wall, and refers to the other sides as the "lower" or "bottom" wall and "side" walls. However, other embodiments may have different cross-sectional shapes and/or numbers of sides (e.g., round, ovoid, semi-circular, three-sided, five-sided, six-sided, etc.).

Similarly, it is to be understood that the term "wall" is used in reference to a corresponding portion of the elongate hollow body. As such, a wall can be either a discrete structure or an area of a larger structure. For example, an elongate hollow body with a generally rectangular cross-section may be constructed by bending or shaping one piece of material such that it forms all of the walls, or by joining four separate and generally planar pieces of material, or by bending and shaping one piece of material and joining that piece of material to another, or the like. As another example, an elongate hollow body with a semi-circular cross-sectional shape may have one generally planar wall and one curved wall, and the side walls and the upper or lower wall are corresponding portions of the curved wall. Similarly, in a hollow body with a round or ovoid cross-sectional shape, the upper, lower, and/or side walls may be corresponding portions of a single wall. Regardless of the cross-sectional shape or the manner of construction, the portions of the elongate hollow body that correspond to the top (i.e., portion with the apertures), bottom, and sides of the elongate hollow body are referred to herein as the top or upper wall, the bottom or lower wall, and the side walls.

The generally closed second end may include an end plate coupled with the upper, lower, and/or side walls. The end plate may be formed as a separate component and coupled with the upper, lower, and/or side walls by welding or other suitable means. Alternatively, the end plate may be formed as an integral portion of the elongate hollow body. For example, in some embodiments the end plate may be formed by bending a distal end of one or more of the walls toward a longitudinal centerline that extends through the elongate hollow body.

One or more through-slots may be disposed in the end plate, in one or more of the walls, between two of the walls, or between the end plate/wall and one or more of the other walls. Optionally, some or all of the through-slots may be at or near the second end of the elongate hollow body.

In some embodiments, with the exception of the through-slot(s), a self-cleaning jet tube may otherwise have the same or similar configuration as a conventional jet tube. In other embodiments, a self-cleaning jet tube may have a configuration that differs from that of a conventional jet tube in other respects, such as in the number of apertures.

In various embodiments, the size, shape, location, and/or number of through-slots may be configured to optimize the evacuation of debris from the jet tube. For example, in some embodiments a through-slot may be generally oblong in shape. Optionally, the greatest length of the through-slot may be at least twice the greatest width of the through-slot. In other embodiments, the length of the through-slot may be 1.5-3 times, 2-4 times, 3-5 times, or more than 5 times the width of the through-slot.

In some embodiments, the apertures may be arranged in rows along a wall or surface of the jet tube, and a through-slot may be positioned in alignment with one of the rows. The airflow along or near a row of apertures may be greater than in other areas (e.g., between the rows), which may enhance the evacuation of debris through the through-slot that is aligned.

In some embodiments, one or more through-slots may be positioned along or near the top wall and/or bottom wall of the jet tube. This may help to evacuate more debris due to the effect of gravity, which may cause debris to settle downward onto the interior side of the top wall (if the jet tube is in the top-side-down orientation) or bottom wall (if the jet tube is in the top-side-up orientation) within the jet tube. Thus, in some embodiments, through-slots may be provided along generally opposite walls of the jet tube to accommodate the use of the jet tube in two orientations. For example, a first through-slot may be positioned along or near the top wall and a second through-slot may be positioned along or near the bottom wall. Optionally, the first and second through-slots may be vertically aligned with one another and/or with a row of apertures.

In addition, the size, shape, and/or number of apertures may be adjusted to offset the effect of airflow through the through-slots. For example, some prior jet tubes include a particular number of apertures (e.g., 303 apertures) arranged in rows of a particular length to provide airflow across an area slightly wider than the typical veneer path. A corresponding embodiment of a self-cleaning jet tube may include a slightly reduced number of apertures (e.g., 300 apertures) arranged in slightly shorter rows to provide airflow across an area substantially the same width as the typical veneer path. The elimination of a small number of apertures may offset the loss of air through the through-slot(s) at the narrow end of the jet tube. Alternatively, the apertures may be reduced in size and/or arranged in other configurations to offset air loss through the through-slot(s).

In a particular embodiment, a jet tube may have three rows of apertures (e.g., 100 apertures per row), and the end plate may have six through-slots approximately 3/16" by 5/8" in size. Three of the through-slots may be disposed along the upper edge of the end plate in vertical alignment with corresponding ones of the rows of apertures. Likewise, the other three through-slots may be disposed along the bottom edge of the plate in vertical alignment with corresponding ones of the rows of apertures, such that two through-slots (one upper and one lower) are vertically aligned with each row of apertures.

In some embodiments, a self-cleaning jet tube may be formed by forming one or more through-slots in an existing jet tube. In other embodiments, a self-cleaning jet tube may be formed by constructing an elongate hollow body from one or more sheets of metal (e.g., steel) and forming the through-slot(s) in the sheets of metal before, during, or after construction of the elongate hollow body. In a particular embodiment, the elongate hollow body may be constructed by forming an upper portion, a lower portion, and an end plate, forming the through-slot(s) in one or more of those components, and coupling the components together (e.g., by welding). In another embodiment, the elongate hollow body may be constructed by forming an upper portion, a lower portion, and an end plate, forming a recess in one or more of those components, and coupling the components together to form a through-between adjacent components.

FIGS. 1A-E illustrate schematic views of an embodiment of a self-cleaning jet tube 100, in accordance with various embodiments. In embodiments, a jet tube 100 may include an elongate hollow body 102 that is generally rectangular in cross-section and tapers from a generally open first end 104 to a generally opposite second end 106. Elongate hollow body 102 may have an upper wall 110 with a plurality of apertures 108 (FIG. 1A), a lower wall 112 (FIG. 1B), generally opposite side walls 114a, 114b (FIG. 1C), end plate 120, and one or more through-slots 124.

In some embodiments, jet tube 100 may further include a flange 116 coupled with the first end 104 of elongate hollow body 102. Flange 116 may be configured to block air leakage around first end 104 when the jet tube is mounted in a use position within a jet veneer dryer. Optionally, jet tube 100 may include a post 122 coupled with the end plate 120 and/or other portion of elongate hollow body 102. Post 122 may be configured for use in mounting the jet tube to a frame of a jet veneer dryer.

End plate 120 may be coupled with the upper, lower, and/or side walls of elongate hollow body 102 at the second end 106 (FIG. 1D). In some embodiments, the walls of elongate hollow body 102 may be formed from one or more sheets of metal, and end plate 120 may be formed from a separate sheet of metal and coupled with the walls (e.g. by welding). In other embodiments, end plate 120 may be integral to elongate hollow body 102 or some portion thereof. For example, in some embodiments end plate 120 may be formed by bending a distal end of one or more of the walls 110/112/114a/114b toward a longitudinal centerline 150 of the elongate hollow body.

In operation, jet tube 100 may be mounted to a jet veneer dryer frame, and heated air may be moved under pressure into the generally open first end 104. The heated air may flow through the elongated hollow body 102 toward the second end 106, exiting through apertures 108. Jet tube 100 may be configured such that the heated air flows from apertures 108 near second end 106 at substantially the same pressure as from apertures 108 near first end 104. Debris may be pushed into jet tube 100 by the heated air. As the heated air pushes the debris toward the second end 106, the debris may be blown through one or more through-slots 124.

The number, size, placement, and configuration of through-slot(s) 124 may vary among embodiments. In some embodiments, end plate 120 may have an outer edge that defines one or more recesses 130 (FIG. 1E). The outer edge of the end plate 120 may be coupled with a wall of the elongate hollow body 102 (e.g., upper wall 110, lower wall 112, side 114a or 114b) such that the portion extends across an open end of the recess 130 (FIG. 1E). The recess 130 in end plate 120 may define or form part of a through-slot 124, and the corresponding wall portion may define or form another part of the through-slot 124, which is thus disposed between the end plate 120 and the corresponding wall(s). Additional examples of end plate and through-slot configurations are illustrated in FIGS. 2A-2E.

The dimensions and shape of recess(es) 130 may vary among embodiments. Although recesses 130 are shown in FIG. 1E as being generally rectangular in shape, in other embodiments a recess 130 may instead be triangular, semi-circular, ovoid, or any other suitable shape. Likewise, the number and locations of recesses 130 may vary among embodiments. While recesses 130 are shown along the outer edge of the end plate 120 in FIG. 1E, recesses 130 may instead be disposed in an outer edge of one or more of the walls. For example, in some embodiments, recesses 130 may be provided along an edge of upper wall 110, lower wall 112, and/or either or both of side walls 114a, 114b. Thus, a recess may be formed in an outer edge of any of walls 110, 120, 114a, or 114b, and the recess and end plate 120 may collectively define a through-slot 124.

The number and locations of through-slot(s) 124 may also vary among embodiments. In some embodiments, a jet tube 100 may have one or more through-slots along or near upper wall 110 or lower wall 112. In various embodiments, one or more through-slots 124 may be disposed along a bottom half of jet tube 100 (e.g., between lower wall 112 and a longitudinal center axis 150 of the jet tube) and another one or more through-slots 124 may be disposed along an upper half of each jet tube (e.g., between upper wall 110 and the longitudinal center axis 150). For example, one or more through-slots 124 may be disposed between end plate 120 and upper wall 110, and another one or more through-slots 124 may be disposed between end plate 120 and lower wall 112 (see e.g., FIGS. 1D, 2A-2E). Alternatively, one or more through-slots 124 may be disposed between end plate 120 and side wall 114a or 114b (see e.g., FIGS. 2B, 2C). Other embodiments may include one or more through-slots 124 formed by two of the walls and the end plate 120 (see e.g., FIG. 2C).

In still other embodiments a through-slot 124 may be disposed in end plate 120 or any one or more of walls 110, 120, 114a, and/or 114b, rather than between the end plate and a wall. For example, some or all of the through-slots 124 may be disposed through end plate 120 (see e.g., FIG. 2E) or through elongate hollow body 102 (see e.g., 224g of FIG. 8).

The dimensions of through-slots 124 may vary among embodiments. Optionally, through-slot 124 may be generally oblong, with a length (i.e., longest dimension) that exceeds the width of the through-slot. In some embodiments, the length of through-slot 124 may be at least twice the width. In other embodiments, the length of through-slot 124 may be at least three times the width. In still other embodiments, the length may 1.5-2 times the width. In any case, the depth of a through-slot 124 may be the thickness of the wall or plate through which the through-slot extends. Again, through-slot 124 may have any suitable shape including, but not limited to, rectangular, trapezoidal, ovoid, and semi-circular.

Figure 3A:
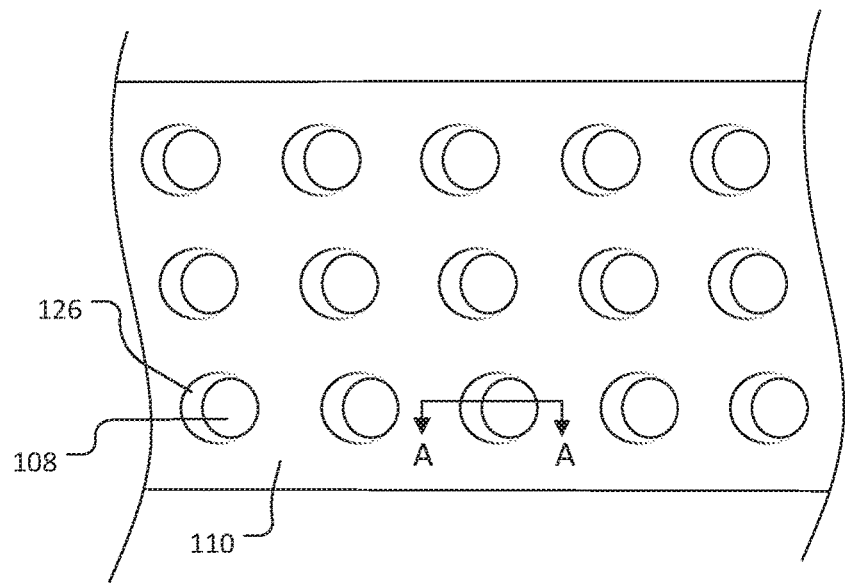
FIGS. 3A-B illustrate an example configuration of apertures for a self-cleaning jet tube.
Figure 3B:
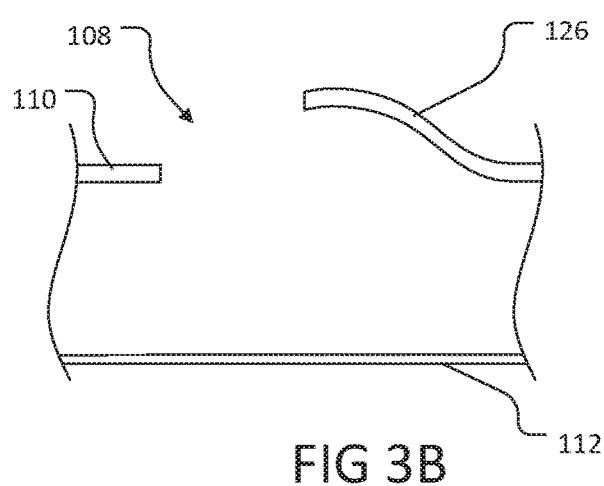

The number and arrangement of apertures 108 may vary among embodiments. FIG. 3A illustrates an example configuration of apertures for a self-cleaning jet tube, and FIG. 3B illustrates a view taken along line A-A of FIG. 3A, all in accordance with various embodiments. Optionally, in some embodiments upper wall 110 may have a plurality of convex or concave dimples 126, and apertures 108 may be arranged along upper wall 110 to at least partially overlap the dimples 126. Such configurations may help to direct heated air against a sheet of veneer at a desired angle. Other embodiments may lack dimples 126 or other such surface features, and apertures 108 may be arranged along a generally flat plane. While the apertures 108 are shown arranged in three rows, in other embodiments the apertures may be arranged in 1-2 rows, more than three rows, or in another pattern such as a grid, staggered, non-linear rows, concentric circles, or in any other manner.

Figure 6:
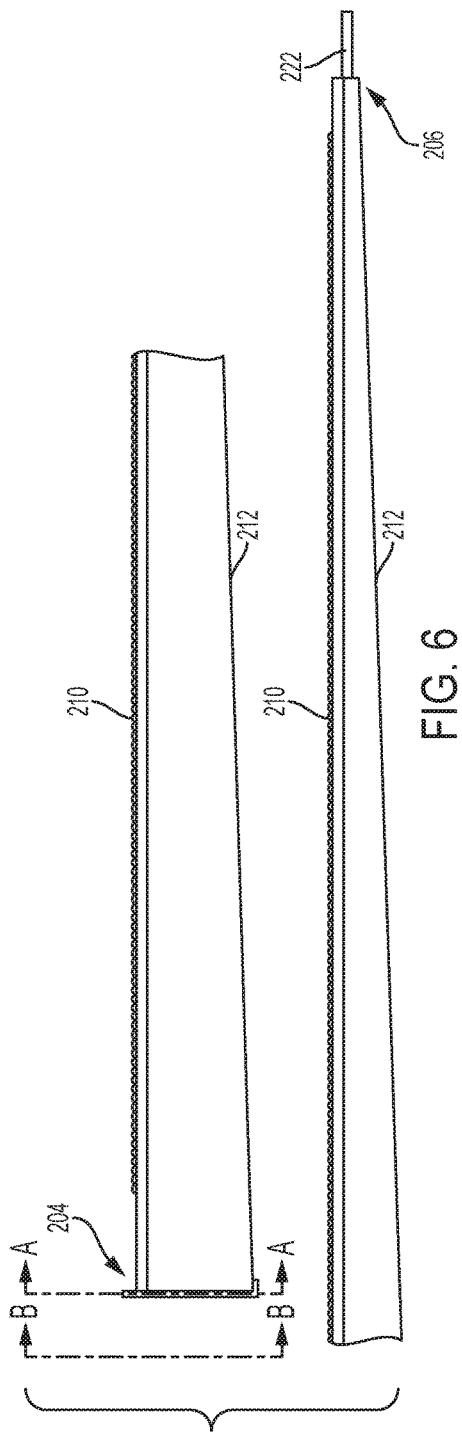
FIG. 6 illustrates a side elevational view of the jet tube of FIG. 5.
Figure 7B:
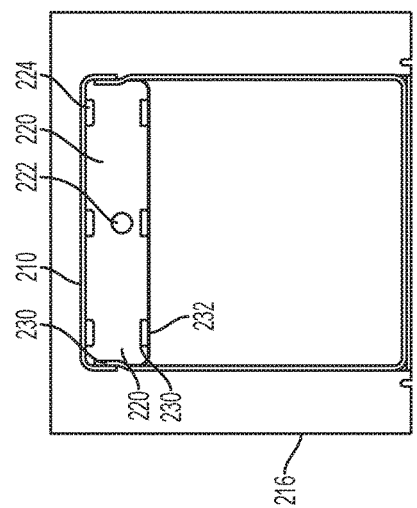
FIGS. 7A-B illustrate sectional views taken along lines A-A and B-B, respectively, of FIG. 6.
Figure 7A:
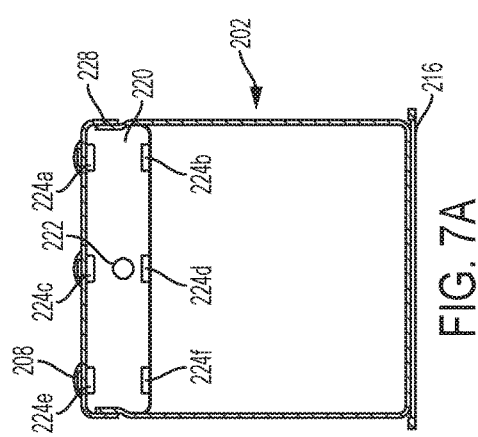
Figure 8:
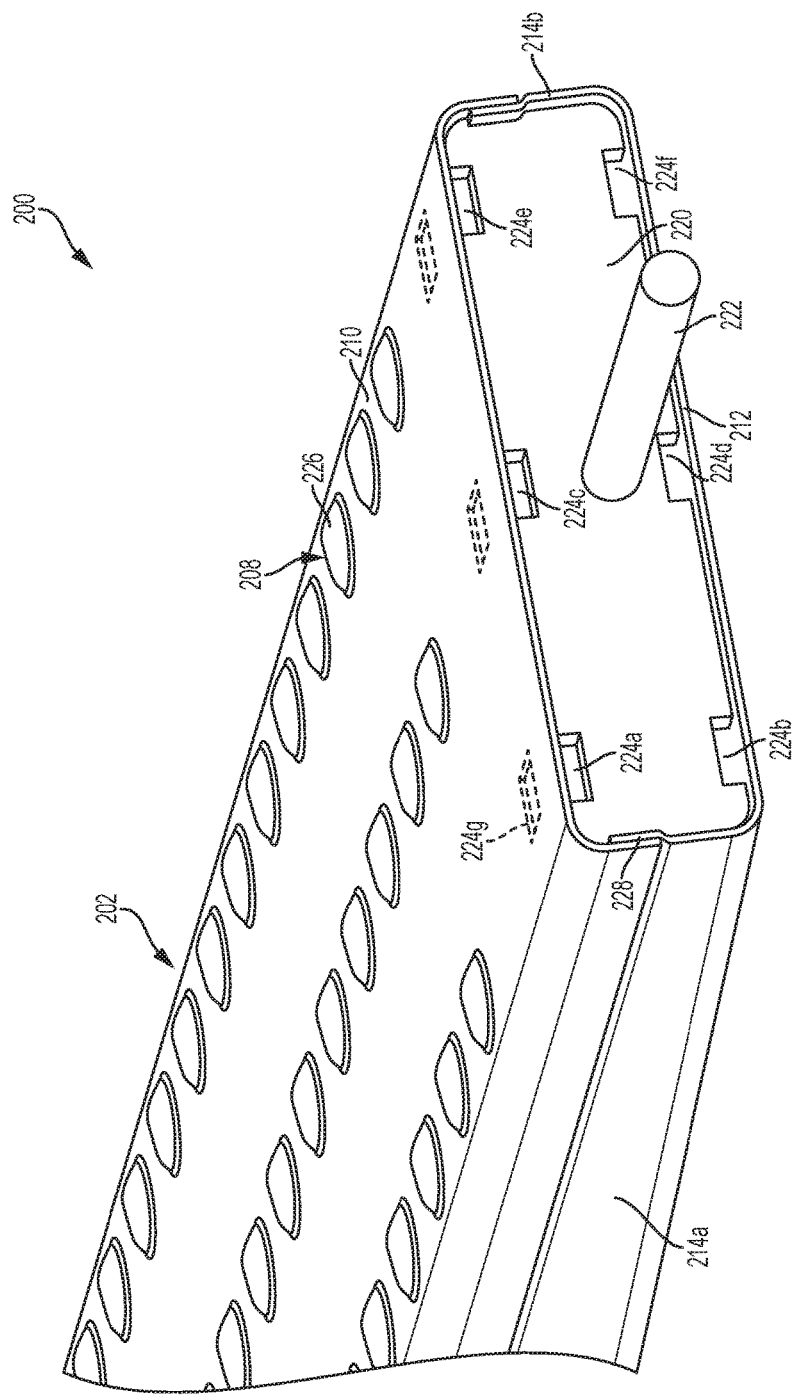
FIG. 8 illustrates a partial perspective view of the embodiment of FIGS. 5A-7B.

FIGS. 4 and 6 illustrate plan and side elevational views, respectively, of an embodiment of a self-cleaning jet tube 200. FIGS. 5A-B illustrate sectional views taken along lines A-A and B-B of FIG. 4, and FIGS. 7A-B illustrate sectional views taken along lines A-A and B-B of FIG. 6. FIG. 8 illustrates a partial perspective view of a self-cleaning jet tube, all in accordance with various embodiments.

Jet tube 200 may have an elongate hollow body 202 with an upper wall 210, a lower wall 212, side walls 214a, 214b, and an end plate 220 coupled with some or all of the walls. Apertures 208 may be arranged in three rows along upper wall 210 to overlap corresponding dimples 226. End plate 220 may have an upper edge with recesses 230 defined therein and a lower edge with additional recesses 230 defined therein (FIG. 8B). Each of the recesses may be aligned with a corresponding one of the rows of apertures. Thus, as illustrated, jet tube 200 may have three through-slots 224a, 224c, 224e between end plate 220 and upper wall 110, and another three through-slots 224b, 224d, 224f between end plate 220 and lower wall 212.

In some embodiments, end plate 220 may have a one or more additional recesses 230 along its lateral edges. In some embodiments, an additional recess 230 may be provided along one or both lateral edges of end plate 220 to form a corresponding through-slot 224 between end plate 220 and one of the side walls 214a or 214b.

In other embodiments, an additional recesses 230 may be configured to accommodate a seam 228 (FIG. 5A) along one or more of the walls. Referring to FIG. 8 by way of example, jet tube 200 may have a first section that forms the upper wall 210 and an upper portion of side walls 214a, 214b, and a second section that forms the lower wall 212 and a lower portion of side walls 214a, 214b. The sections may be cut/shaped or otherwise constructed from one piece of metal (e.g., a sheet of steel) or two or more pieces of metal. When fitted together, the corresponding edges of the sections may overlap at seam 228. Optionally, the corresponding edges may be coupled together at seam 228 by welding or other suitable techniques. However, the number and configuration of sections may vary among embodiments, and some embodiments may have only one section, one section and an end plate, more than two sections and an end plate, or any other number of sections coupled together in any suitable manner.

Optionally, some or all of the through-slots 224 may be approximately 3/16" wide and 5/8" long. Alternatively, some or all of the through-slots may be approximately 1/16" to 5/16" wide and 3/8" to 7/8" long. In other embodiments, through-slots 224 may vary in number, size, shape, and/or location.

Upper through-slots 224a, 224c, and 224e may be positioned substantially in vertical alignment with corresponding ones of the rows of apertures. Likewise, lower through-slots 224b, 224d, and 224f may be positioned substantially in vertical alignment with corresponding ones of the rows of apertures, such that through-slots 224a and 224b are vertically aligned with a first row of apertures, through-slots 224c and 224d are vertically aligned with a second row of apertures, and through-slots 224e and 224f are vertically aligned with the third row of apertures.

In other embodiments, one or more of the through-slots may be disposed through the end plate 220. In still other embodiments, one or more of the through-slots may be disposed through the upper, lower, and/or side walls (see e.g., FIG. 8, alternative through-slots 224g shown in dotted lines). Various embodiments may have a through-slot disposed through the end plate, and/or a through-slot disposed through one or more walls of the elongate hollow body, and/or a through-slot disposed between the end plate and a wall of the elongate hollow body.

Optionally, some or all of the through-slots may be located near the narrower second end 206 of the jet tube. For example, in some embodiments some or all of the through-slots may be positioned at or near an intersection between the end plate and one or more of the walls of the elongate hollow body. In other embodiments, some or all of the through-slots may be positioned between the end plate and the rows of apertures. In still other embodiments, through-slots may be provided between apertures or between the rows of apertures.

In various embodiments, jet tube 200 may have 300 apertures 308 arranged in three rows (100 apertures per row). In other embodiments, jet tube 200 may have fewer than 300 apertures or more than 300 apertures. In some embodiments, jet tube 200 may have a reduced number of apertures in comparison to a conventional jet tube. Optionally, jet tube 200 may have the same number of rows of apertures as a conventional jet tube, but with one or two fewer apertures per row than the conventional jet tube. For example, where a conventional jet tube has a number of apertures (N) that are arranged in a number of rows (R), jet tube 200 may have N-R apertures arranged in R rows or N-2R apertures arranged in R rows.

Figure 9:
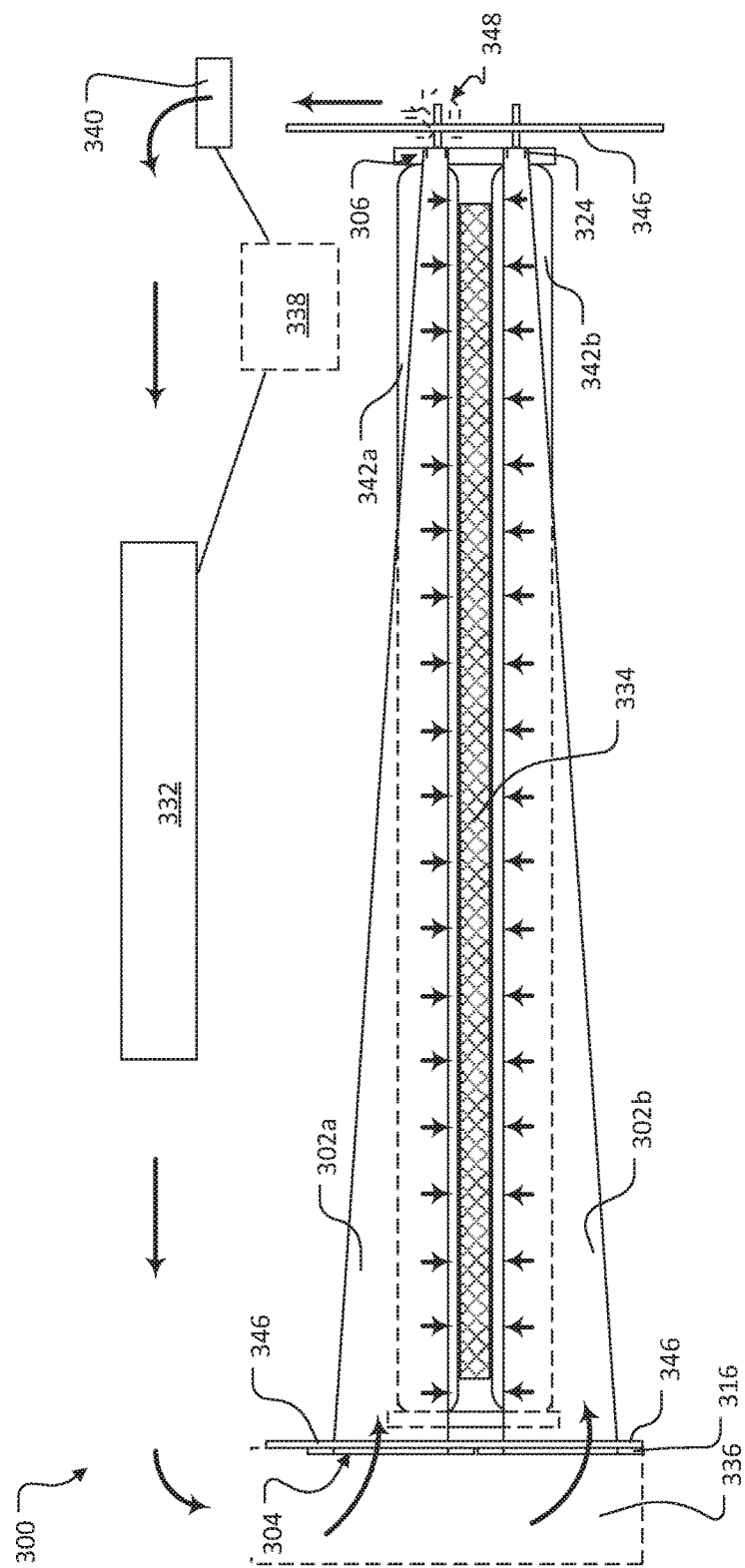
FIG. 9 illustrates a block diagram of a jet veneer dryer system.

FIG. 9 illustrates an embodiment of a jet veneer dryer system 300, in accordance with various embodiments.

System 300 may include a frame 346, a conveyor system with paired upper and lower rollers 342a, 342b, and self-cleaning jet tubes 302a, 302b. System 300 may also include one or more of a fan 340, a heater 332, a plenum space 336, and/or a computer system 338. In some embodiments, computer system 338 may be configured to control various operations of heater 332, fan 340, rollers 342a, 342b, and/or other components of system 300.

Frame 346 may have a proximal end, a distal end, and generally opposite first and second sides. Rollers 342a, 342b may be coupled at a first end with the first side of frame 346 and coupled at an opposite second end with the second side of frame 346. Thus, rollers 342a, 342b may extend transverse to a path of flow that extends through the frame between the rollers. Rollers 342a, 342b may be rotatable in opposite rotary directions to convey a piece of veneer 334 along the flow path through frame 346.

Jet tubes 302a, 302b may be generally as described herein with reference to jet tubes 100 and/or 200. For example, jet tubes 302a, 302b may be substantially rectangular in cross section and tapered from an open first end to a generally closed second end, each with upper and lower surfaces, a plurality of apertures in one of the surfaces, and one or more through-slots 324. Optionally, the length of the through-slot(s) may be at least twice the width. In some embodiments, one or more through-slots 324 may be disposed along a bottom half of each jet tube (e.g., below a longitudinal center axis of the jet tube). Another one or more through-slots 324 may be disposed along an upper half of each jet tube (e.g., above a longitudinal center axis of the jet tube). Some or all of the through-slots 324 may be positioned at or near the second end 306.

Jet tubes 302a, 302b may have a generally open first end 304 with a flange 316 and a generally opposite second end 306. First end 304 may be mounted to the first side of frame 346 with flange 316 positioned to block or reduce airflow between frame 346 and the corresponding jet tube 302a/302b. Second end 306 may be mounted to the second side of frame 346. Jet tube 302a may be mounted to frame 346 above the flow path in a top-side-down orientation, and jet tube 302b may be mounted to frame 346 below the flow path in a top-side-up orientation. Jet tubes 302a, 302b may be positioned between adjacent pairs of rollers 342a, 342b and oriented generally transverse to the path of flow.

In operation, air may be circulated to heater 332 and from heater 332 to input plenum 336 by one or more fans 340. The fan(s) 340 may be configured to direct heated air to the input plenum 336 which may result in an increased air pressure within input plenum 336. The heated air may flow from input plenum 336 into the open first ends 304 of the jet tubes 302a, 302b. The heated air may then exit the jet tubes through the apertures. Debris 348 may be carried by the heated air into the jet tubes 302a, 302b and toward the second ends 306 to one or more of the through-slots 324. The debris 348 may be pushed into and through one or more of the through-slots 324 to exit the jet tube 302a or 302b.

Figure 10:
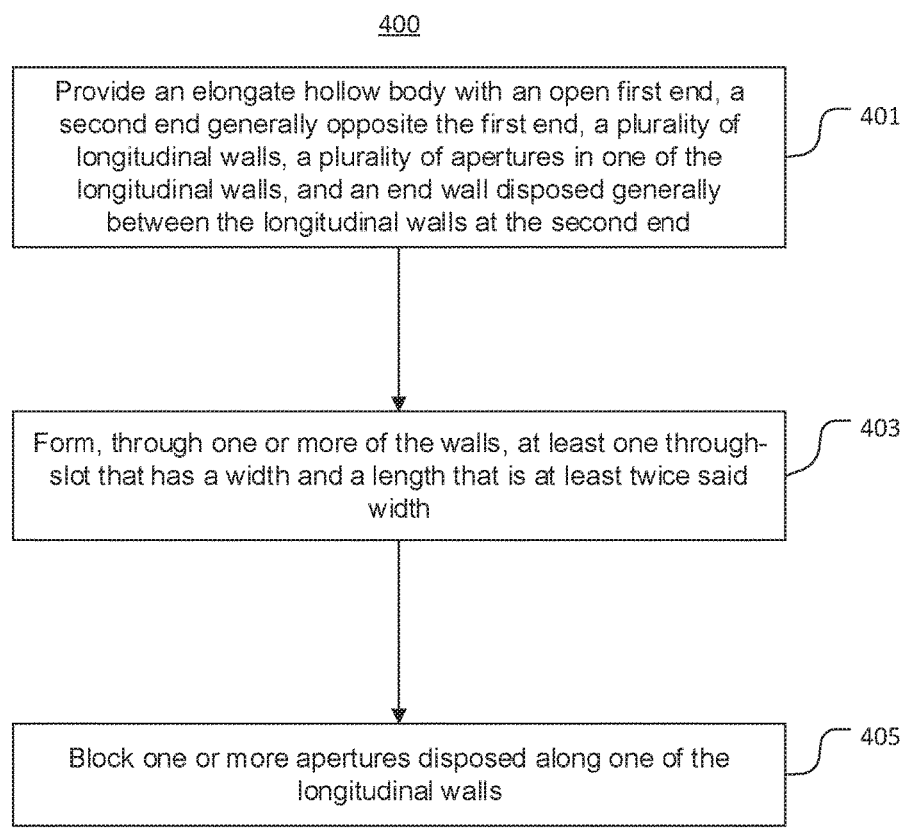
FIG. 10 illustrates a method of forming a self-cleaning jet tube.

FIG. 10 illustrates a method of forming a self-cleaning jet tube, in accordance with various embodiments In various embodiments, method 400 may begin at block 401. At block 401, an elongate hollow body (e.g., elongate hollow body 102/202) may be provided. The elongate hollow body may have an open first end (e.g., first end 104 or 204), a second end (e.g., second end 106 or 206) generally opposite the first end, a plurality of longitudinal walls (e.g., upper wall 110 or 210, lower wall 112 or 212, side walls 114a, 114b or 214a, 214), and an end wall (e.g., end plate 120 or 220) disposed generally between the longitudinal walls at the second end. The elongate hollow body may also have a plurality of apertures (e.g., apertures 108 or 208) in one of the longitudinal walls.

In some embodiments, providing the elongate hollow body may include constructing one or more sections of the elongate hollow body from one or more pieces of metal. Some or all of the sections may be coupled together at block 401. Alternatively, one of the sections may be coupled to another of the sections at block 403 or thereafter. In other embodiments, the elongate hollow body may be an existing jet tube (e.g., a conventional jet tube) or some portion thereof.

At block 403, at least one through-slot (e.g., through-slot 124 or 224) may be formed through one or more of the walls. The through-slot(s) may have a width and a length that is at least twice the width.

In some embodiments, the through-slot(s) may be formed in an existing jet tube by using a cutting device (e.g., a laser/plasma cutting device, a cutting blade, a grinder, a cutting torch, etc.).

In other embodiments, the through-slot(s) may be formed in an existing jet tube by removing a portion of the existing jet tube, such as an end plate or a wall section, forming a recess (e.g., recess 130 or 230) or through-slot in the removed portion or a replacement portion, and coupling the removed/replacement portion with the remaining portion of the existing jet tube. Again, the through-slot(s) may be formed through one plate/wall, between the end plate and a wall, and/or between adjacent walls. In some embodiments, the through-slot(s) may be formed along or near the upper wall, the lower wall, or both.

Optionally, at block 405 one or more of the apertures may be blocked. Blocking one or more of the apertures may at least partially offset the loss of air through the through-slot(s), which may help to maintain a desired air pressure at the remaining apertures. In some embodiments, the apertures nearest to the second end may be blocked. For example, if the apertures are arranged in three rows that extend longitudinally from the first end to the second end, the end-most aperture in each row may be blocked.

Blocking the aperture(s) may involve welding a metal plate over the aperture(s), replacing a portion of the wall with a plate that has fewer or no apertures, or any other suitable technique. In some embodiments block 405 may be omitted.

Alternatively, in some embodiments the through-slot(s) may be formed before or during construction of the elongate hollow body. For example, a through-slot may be formed in one or more components of the jet tube before coupling some or all of the components together. An example of such an embodiment is illustrated in FIG. 11.

Figure 11:
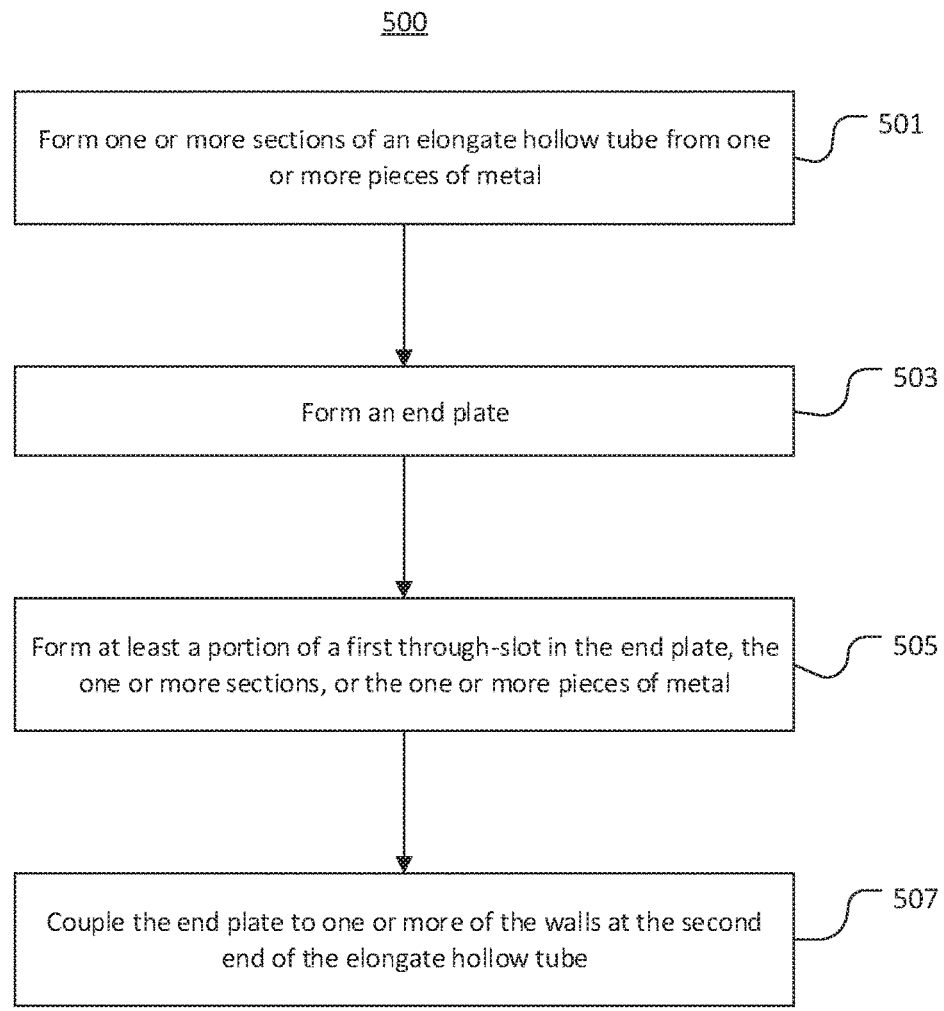
FIG. 11 illustrates another method of forming a self-cleaning jet tube, all in accordance with various embodiments.

Referring now to FIG. 11, method 500 may begin at block 501. At block 501, one or more sections of an elongate hollow tube may be formed from one or more pieces of metal. The section(s) may be configured to be coupled together to form an elongate hollow tube that is generally rectangular in cross-section and tapered from a generally open first end to a second end. In some embodiments, the one or more pieces of metal may be sheets of metal, and two or more sections may be formed (e.g., cut and/or shaped) from the sheets of metal. Optionally, apertures (e.g., apertures 108 or 208) may be formed in one of the sections at block 501.

At block 503, an end plate (e.g., end plate 120 or 220) may be formed. The end plate may be formed, for example, by cutting or shaping a separate piece of metal to fit the opening at the second end of the elongate hollow body. Alternatively, the end plate may be formed by bending an end of one or more of the sections such that the end(s) will be oriented transverse to the longitudinal walls in the assembled jet tube.

At block 505, at least a portion of a first through-slot may be formed in the end plate or in one of the sections. Alternatively, the first through-slot or a portion thereof may be formed in the one or more pieces of metal at block 505, and method 500 may begin at block 505 before proceeding to block 501. In some embodiments, forming at least a portion of the first through-slot may include forming a recess (e.g., recess 130) in an outer edge of any of the above components. The recess may be positioned such that formation of the first through-slot (e.g., between two sections or between an end wall and a section) can be completed by coupling the sections and/or end plate together.

In other embodiments, the entire through-slot may be formed at block 505 by removing a corresponding portion of material (e.g., by cutting) from any one of the components. Optionally, the aperture or first through-slot may be positioned such that the first through-slot will be disposed along or proximal to an upper or lower longitudinal wall of the assembled jet tube.

At block 507, the end plate may be coupled to one or more of the walls at the second end of the elongate hollow tube. In some embodiments, the end plate and one of the sections may be coupled together before adding the other section(s), if any. In other embodiments, some or all of the sections may be coupled together before adding the end plate.

Various operations are described above as multiple discrete actions or operations in turn, for the purpose of clarity and to aid explanation of the subject matter. However, the operations are not necessarily order dependent. In particular, any or all of the operations may be performed in a different order than in the described embodiments. Additional operations may be performed in some embodiments, and one or more of the operations may be omitted in other embodiments.

In accordance with various embodiments, self-cleaning jet tubes with one or more through-slots may provide an opportunity to extend operating/production time between dryer cleaning outages. For example, in regions with relatively low fiber moisture, jet tubes experience comparatively more acute fiber accumulation (e.g., North American west coast and cold climates), the use of such self-cleaning jet tubes may increase production by 20-30 shifts annually.

In addition, self-cleaning jet tubes may significantly reduce overhead costs by reducing or eliminating the need to staff 20-30 shifts annually with 4-6 man cleaning crews. Such jet tubes may also reduce the loss production that is typically experienced during the last shifts prior to cleaning as a result of fiber accumulation in the narrow ends of the jet tubes.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A system for drying veneer, the system comprising:
   a veneer dryer apparatus that includes a frame, a conveyor configured to move sheets of veneer along a flow path that extends through the frame, a plenum along one side of the conveyor, and one or more fans operable to direct air into the plenum, and
   a first jet tube operatively coupled with the veneer dryer apparatus, wherein the first jet tube includes an elongate hollow body that is tapered from an open first end to a generally opposite second end, the elongate hollow body having an upper wall with a plurality of apertures, a lower wall, one or more side walls, an end wall located at the second end, a longitudinal axis that extends, parallel to the upper wall, through the first end and the end wall, and a first through-slot disposed at or near the second end through at least one of said walls,
   wherein the first end is in fluid communication with the plenum to thereby receive air into the elongate hollow body and the upper surface is above or below, and generally parallel to, the flow path, and
   wherein the first jet tube is configured to direct received air toward the second end and through said apertures with the first through-slot unblocked to thereby evacuate debris through the first through-slot during normal operation of the veneer dryer apparatus.

2. The system of claim 1, wherein the first through-slot is generally oblong in shape.

3. The system of claim 1, wherein the first through-slot has a length and a width, and the length is at least twice the width.

4. The system of claim 1, wherein the first through-slot is disposed through the end wall.

5. The system of claim 4, wherein the first through-slot is ⅛" to ¼" in width and ½" to ¾" in length.

6. The system of claim 1, wherein the first through-slot is disposed through the upper wall, the lower wall, or one of the side walls.

7. The system of claim 6, wherein the first through-slot is ⅛" to ¼" in width and ½" to ¾" in length.

8. The system of claim 1, wherein the first through-slot is disposed between the end wall and the upper wall, the lower wall, or one of the side walls.

9. The system of claim 1, the first jet tube further including a second through-slot, wherein one of said through-slots is disposed through the upper wall or between the end wall and the upper wall, and the other of said through-slots is disposed through the lower wall or between the end wall and the lower wall, and said through-slots are adjacent to the end wall.

10. The system of claim 9, wherein the apertures are arranged longitudinally along the upper wall in one or more rows, and at least one of the through-slots is positioned in alignment with a first one of the one or more rows.

11. The system of claim 1, the first jet tube further including a second through-slot, wherein at least one of the through-slots is disposed between the end wall and one of the side walls.

12. The system of claim 1, further including a second jet tube operatively coupled with the veneer dryer apparatus, wherein one of the jet tubes is disposed above the flow path and the other one of the jet tubes is disposed below the flow path.

13. The system of claim 1, wherein the first jet tube further includes a flange at the first end of the elongate hollow body, wherein the flange is coupled to a wall of the plenum to block air leakage between the elongate hollow body and the plenum.

14. The system of claim 1, wherein the first jet tube further includes a post connected to the end wall and extending outwardly from the second end, and wherein the post is coupled to the frame.

15. The system of claim 1, wherein the apertures are arranged in two or more longitudinal rows, and the first through-slot is aligned with one of the rows.

16. The system of claim 15, wherein the plurality of apertures is 300 apertures.

17. The system of claim 16, wherein at least one of the walls of the elongate hollow body has an outer edge that defines a recess, and the first through-slot is at least partially defined by the recess.

18. The system of claim 17, wherein the recess is ⅛" to ¼" in width and ½" to ¾" in length.

19. A method of modifying a jet veneer dryer, wherein the jet veneer dryer is configured to accommodate a conventional jet tube at each of a plurality of locations along a flow path that extends through the jet veneer dryer, and to direct airflow to the conventional jet tubes to maintain a veneer drying air pressure along corresponding portions of the flow path during normal operation, the method comprising:

operatively coupling a first jet tube with the jet veneer dryer at a first one of said locations, wherein the first jet tube includes an elongate hollow body that is tapered from an open first end to a generally opposite second end, wherein the elongate hollow body has a plurality of longitudinal walls, a plurality of apertures along one of the longitudinal walls, an end wall disposed at the second end and transverse to the longitudinal walls, and a first through-slot disposed at or near the second end through at least one of said walls, wherein the first jet tube is configured to direct air through the apertures at the veneer drying air pressure with the first through-slot unblocked during normal operation of the jet veneer dryer.

20. The method of claim 19, wherein the first through-slot is disposed through the end wall.

21. The method of claim 20, wherein the first through-slot is ⅛" to ¼" in width and ½" to ¾" in length.

22. The method of claim 19, wherein the first through-slot is disposed through the upper wall, the lower wall, or one of the side walls.

23. The method of claim 22, wherein the first through-slot is ⅛" to ¼" in width and ½" to ¾" in length.

24. The method of claim 19, wherein the first through-slot is disposed between the end wall and the upper wall, the lower wall, or one of the side walls.

25. The method of claim 19, wherein the first jet tube further includes a post connected to the end wall and extending outwardly from the second end, and wherein operatively coupling the first jet tube with the jet veneer dryer includes coupling the post to a frame of the jet veneer dryer.

26. The method of claim 19, wherein the plurality of apertures is 300 apertures, and the conventional jet tube includes 303 apertures.

* * * * *